May 15, 1951     A. B. CAMP ET AL     2,552,516
TRIGGERED FISHING DEVICE
Filed March 25, 1947
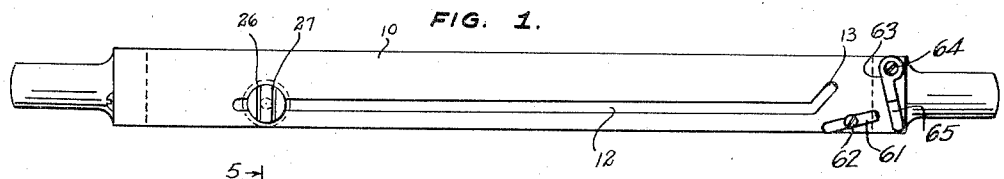
FIG. 1.
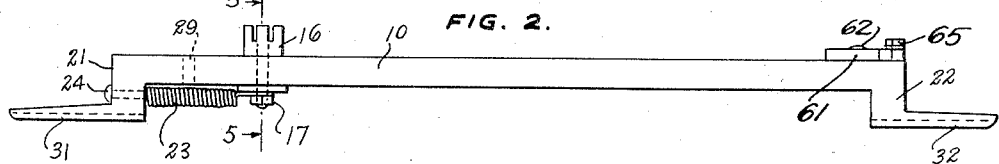
FIG. 2.
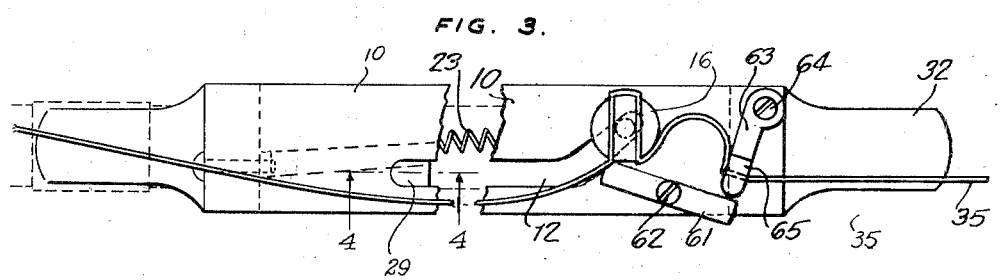
FIG. 3.
FIG. 4.
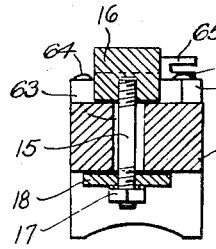
FIG. 5.
FIG. 6.
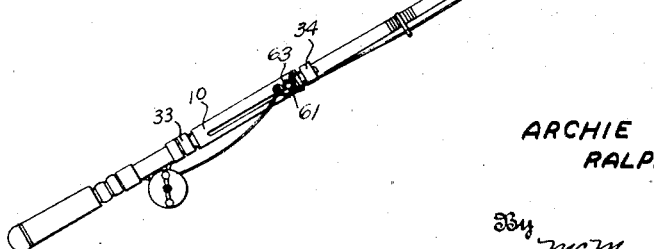
Inventor
ARCHIE B. CAMP, AND
RALPH E. CROSS,
By McMorrow, Berman & Davidson
Attorneys Patented May 15, 1951

2,552,516

UNITED STATES PATENT OFFICE 2,552,516

TRIGGERED FISHING DEVICE

Archie B. Camp, Rockville, Md., and Ralph E. Cross, Washington, D. C.

Application March 25, 1947, Serial No. 736,966

1 Claim. (Cl. 43—15)

This invention relates to fishing apparatus, and more particularly to an automatic triggering mechanism that will be tripped for actuation when the line is disturbed by a fish.

With the usual form of fishing rod, it is necessary for the fisherman to manipulate the rod at exactly the proper moment in order to properly hook the fish. In the present invention, however, the automatic triggering mechanism may be left unattended, and a predetermined tension on the line by a fish will automatically release the trigger to pull sharply upon the line.

A preferred embodiment of the invention is illustrated and described in the accompanying specification, but it is to be understood that various changes and modifications may be made therein without departing from the spirit of the invention as hereinafter claimed.

Figure 1 is a top plan view of one form of the device, the trigger mechanism being shown in inoperative position.

Figure 2 is a front elevation of the same device.

Figure 3 is an enlarged top plan view of the same device, partially broken away, with the trigger mechanism shown in set position.

Figure 4 is a fragmentary vertical section taken along the line 4—4 of Figure 3.

Figure 5 is a vertical section taken along the line 5—5 of Figure 2.

Figure 6 shows the device applied to a fishing rod.

The device comprises a body 10 that is adapted to be positioned alongside a fishing pole 11. The body 10 is provided with a longitudinal slot 12 running lengthwise thereof and curved at the end towards the tip of the fishing pole 11, as shown at 13. A bolt 15 is adapted to slide freely in the slot 12. The bolt 15 is longer than the width of the slot 12, and is provided at one end with a head 16 and at the other end with a nut 17. A washer 18 is positioned between the nut 17 and the body 10. It will be seen, therefore, that the head 16 and the washer 18 provide guides for the bolt 15 as it travels in the slot 12.

The body 10 is formed at its ends with two angular portions 21 and 22. A coil spring 23 is attached to one angular portion 21 of the body 10, by means of a screw 24. The other end of the coil spring 23 is secured to the bolt 15, preferably between the washer 18 and the nut 17. The spring 23 is normally biased to keep the bolt 15 in retracted position, as shown in Figures 1 and 2.

The head 16 of the bolt 15 is provided with two parallel slots 26 and 27, for a purpose to be described more fully hereinafter. A movable lever arm 61, pivoted on a pivot 62, is adapted to engage the head 16 and to be latched in position by a latch 63 mounted on a pivot 64. The latch 63 is provided with a slot 65, through which the line 35 may be threaded. A pull on the line 35 will move the latch 63 counter-clockwise. The lever arm 61 will then be free to turn counter-clockwise on its pivot 62, and the spring 23 will pull the head 16 to the left. The straight end of the slot 12 may be provided with a rubber cushion or bumper 29.

The device, which may be constructed as an integral part of the fishing rod 11, is here shown as attachable thereto. For this purpose, the body 10 has two extensions 31 and 32, beyond the angular portions 21 and 22 respectively, that are shaped to fit snugly against the cylindrical portions of the fishing rod 11. The extension 31 may fit into a stationary sleeve 33 near the base of the fishing rod 11, and a movable sleeve 34 riding on the rod 11 is moved to cover and secure the extension 32. The bolt 15 is manually moved in the slot 12 until it is caught and held by friction in the curved end 13 of the slot and the fishing line 35 may then be looped through the slots 26 and 27 in the head 16 of the bolt 15.

When a fish nibbles on the bait, the line 35 will be pulled, as shown in the figures. This will cause the head 16 to travel downwardly in the curved portion 13 of the slot, and the coil spring 23 will at once yank the bolt 15 to the left. The member 29 will cushion the bolt 19 at the end of its travel in the slot 12. This jerk on the line 35 will automatically hook the fish, and the fisherman, by a flick of the finger, can release the line 35 from the device and proceed to land the fish in the usual manner.

It will be noted that the device does not detract from the use of the pole 11 for casting or other forms of fishing.

The device may be made of plastic, metal, wood, or other suitable substances. The triggering action may be controlled by varying the strength or dimensions of the spring 23, the length of the slot 12, the degree of curvature of the portion 13, and the dimensions of the lever arm 61 and the latch 63.

What is claimed is:

An automatic fishing device adapted to be connected to a fishing line comprising a body member having a longitudinal slot formed with a curved portion at one end, a line-gripping bolt slidable in said slot, resilient means urging said bolt toward the other end of said slot, a lever rockable on said body and engaging said bolt for restraining said bolt in said curved end of the slot, and a latch member rockable on said body and engaging said lever and said line for normally securing said bolt at said one end of said slot and rockable upon tensioning of said line for releasing said bolt for sliding movement by said resilient means.

ARCHIE B. CAMP.
RALPH E. CROSS.

REFERENCES CITED

The following references are of record in the file of this patent:

UNITED STATES PATENTS

| Number | Name | Date |
| --- | --- | --- |
| 154,141 | Hill | Aug. 18, 1874 |
| 272,232 | Gaume | Feb. 13, 1883 |
| 657,518 | Cook | Sept. 11, 1900 |

FOREIGN PATENTS

| Number | Country | Date |
| --- | --- | --- |
| 87,575 | Germany | July 18, 1896 |